(12) United States Patent
Brand

(10) Patent No.: US 6,667,084 B2
(45) Date of Patent: Dec. 23, 2003

(54) WASTE CONTAINERS

(75) Inventor: Dieter Brand, Dausenau (DE)

(73) Assignee: Leifheit AG, Nassau (DE)

( * ) Notice: Subject to any disclaimer, the term of this patent is extended or adjusted under 35 U.S.C. 154(b) by 33 days.

(21) Appl. No.: 09/876,561

(22) Filed: Jun. 7, 2001

(65) Prior Publication Data

US 2002/0009567 A1 Jan. 24, 2002

(30) Foreign Application Priority Data

Jun. 7, 2000 (DE) .......................... 100 28 296
Jun. 7, 2000 (DE) .......................... 100 28 298

(51) Int. Cl.[7] .............................................. B32B 27/16
(52) U.S. Cl. ..................................................... 428/35.7
(58) Field of Search ........................................ 428/35.7

(56) References Cited

U.S. PATENT DOCUMENTS

| | | | |
|---|---|---|---|
| 5,105,968 A | 4/1992 | Fiterman et al. | 220/334 |
| 5,250,356 A | 10/1993 | Batzar | 428/421 |
| 5,562,592 A | 10/1996 | Curiel | 588/259 |
| 5,733,698 A * | 3/1998 | Lehman et al. | 430/66 |
| 5,965,226 A * | 10/1999 | Muschelewicz et al. | 428/42.3 |
| 6,022,553 A * | 2/2000 | Anders et al. | 424/411 |

FOREIGN PATENT DOCUMENTS

| | | |
|---|---|---|
| DE | 1 920 523 | 11/1970 |
| EP | 0 611 742 A1 | 8/1994 |
| EP | 0 980 665 A1 | 2/2000 |
| EP | 1 038 803 A1 | 9/2000 |
| GB | 1 205 268 | 9/1970 |
| GB | 2 192 377 A | 1/1988 |
| WO | WO 99/58430 | 11/1999 |

OTHER PUBLICATIONS

Patent Abstracts of Japan, vol. 1997, No. 11, Nov. 28, 1997 of JP 09 187885 A, Jul. 22, 1997, "Antibacterial Fluororesin–Coated Vessel".

Derwent Abstracts, XP–002170939 of JP 02 083275 A "Porous Ceramic Water Absorb Plate Refrigerate Evaporation Pan", Mar. 23, 1990.

* cited by examiner

*Primary Examiner*—Sandra M. Nolan
(74) *Attorney, Agent, or Firm*—Frishauf, Holtz, Goodman & Chick, P.C.

(57) ABSTRACT

A waste container with an inner lining. The inner lining has at least an inner dirt-repelling layer of an adhesion-reducing polymer material. The direct-repelling layer has a non-smooth surface and can contain an anti-bacterial agent.

11 Claims, 1 Drawing Sheet

WASTE CONTAINERS

BACKGROUND

The invention concerns cooking utensils and waste containers for household use, particularly for use in the kitchen.

For both cooking utensils and waste containers there is a common problem of sticking of food and the potential for contamination.

Waste containers are offered on the market in the most varied designs and serve for the purpose of receiving household wastes and particularly kitchen wastes of various kinds, especially waste food products. It is thus unavoidable that both liquid and paste-like wastes are introduced into the container, which necessarily leads to contamination. This is countered in part by providing the waste containers with an additional inner container of sheet metal or plastic or by the use of plastic bags. However, the problem of contamination is only solved inadequately in this way. Insert containers become contaminated and, as a practical matter must be cleaned after every use. The use of plastic bags as liners is also problematical as they can be easily torn by sharp objects such as cans and glass.

As for utensils for cooking and household use, particularly containers for food storage or cooking utensils such as skillets or frying pans and baking tins, these also come in contact with food which must be kept from sticking but can also contaminate the utensils. A coating, which is comprised of an adhesion-reducing, polymeric material can be used to reduce sticking and the potential for contamination.

"Anti-stick" coatings (especially polytetrafluoroethylene (PTFE)) in different degrees of quality are used particularly for frying pans and cooking and baking tins of the general prior art. However, further development or improvement of these articles has stagnated for several years and is only characterized by new superlatives in marketing promotions.

The object of the invention with respect to the cooking utensils is to clearly improve known, common coatings with respect to their effectiveness and to open up new fields of application.

The object of the invention with respect to waste containers is to make available waste containers, in which contamination and the troublesome cleaning made necessary by contamination are reduced to a minimum.

BRIEF DESCRIPTION OF THE INVENTION

The objects of the invention are attained by use of coatings on known utensils or containers.

The waste container of the present invention is characterized in that at least its inner lining is comprised of a dirt-repelling layer of an adhesion-reducing polymeric material. This special inner layer introduces a clearly reduced tendency to contamination of containers. This effect is clearly increased by providing this layer with a microscopically "rough" surface (i.e. a non-smooth surface like the surface of a lotus blossom) in another embodiment of the invention (as defined below).

Another additional covering layer of silicone on the microscopically "rough" (i.e. non-smooth) surface reduces the uptake of contamination to practically zero.

With respect to the utensils for cooking and household use, particularly frying pans and baking tins, these are provided a coating, which is comprised of an adhesion-reducing, polymeric material, characterized in that the layer is provided with a filler with a particle size ≧ the layer thickness of the coating in order to produce the microscopically "rough" (i.e. non-smooth) surface.

As compared with known applications of an anti-sticking layer, as for frying pans and baking tins, a strikingly noticable improvement is introduced in the anti-sticking behavior even in the case of difficult foods, with the inventive coating. The invention also introduces a clear improvement in the handling of many normal household utensils (e.g., ladling spoons, pan turners, vegetable spoons, salad bowls, bowls, mixing bowls). Even storage containers (e.g., containers for the refrigerator and freezer) are made less sensitive to contamination and can be clearly cleaned more easily, when carrying a coating according to the present invention.

DETAILED DESCRIPTION

Figure 1:
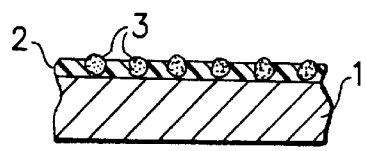
FIG. 1 is a substrate forming an item for kitchen and home use having an anti-stick polymer coating containing a filler.
Figure 2:
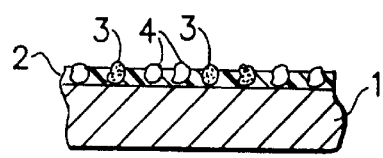
FIG. 2 is a substrate forming an item for kitchen and home containing a filler of mixed micro-fine sand and anti-bacterial agent.

The embodiments of this invention are characterized by adhesion reducing (non-stick) polymeric material coatings as described below. The methods for applying non-stick coatings such as PTFE and silicone are well-known. The coating according to the invention can be applied by usual methods for applying such polymers to substrates, with modification as required and which would be obvious to workers in the art in view of the present disclosure.

It is particularly useful for cooking utensils such as freezer containers, refrigerator containers, salad bowls, mixing bowls, etc. to provide the layer with an antibacterial-acting additive. The effect of suppressing the propagation of bacteria is very clearly noticeable in the storage of foods.

Utensils for cooking and household use, particularly skillets or frying pans 6 spatula 7 and baking tins, with a coating which is comprised of an adhesion-reducing, polymeric material are characterized in that the layer 2 is provided with a filler 3 with a particle size ≧ the layer thickness of the coating in order to produce a rough surface. Preferably the filler particles 3 are micro-fine quality sand although other similar materials or heavy metal antibacterial agents 4 as discussed below can be used as part or all of the filler.

In a second embodiment, utensils for cooking and household use described above, are further characterized in that the layer thickness lies in a range between 5 $\mu$m and 20 $\mu$m, preferably between 7 $\mu$m and 15 $\mu$m and the filler particle size is about 10% greater than the layer thickness to give the surface a microscopic roughness. The particle size will therefore usually range from about 5.5 to about 22 $\mu$m depending on the layer thickness used.

Figure 3:
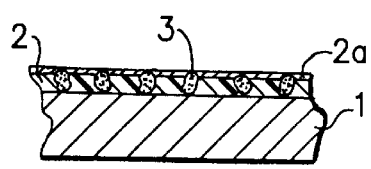
FIG. 3 is a substrate forming an item for kitchen and home use containing a filler and having a covering layer.
Figure 4:
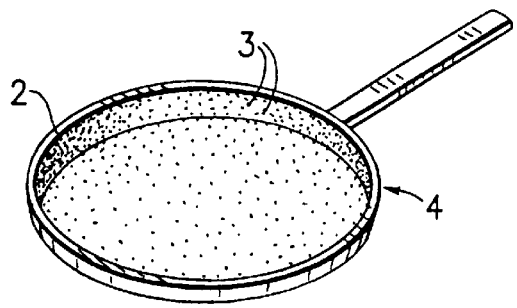
FIG. 4 is a skillet having an anti-stick coating according to the invention.
Figure 5:
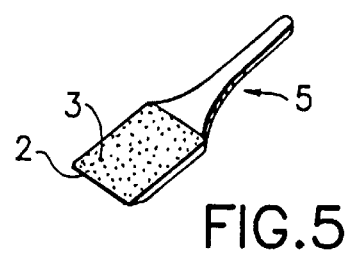
FIG. 5 is a spatula containing an anti-stick coating according to the invention.

In a third embodiment (referring to FIG. 3), utensils for cooking and household use described above (as well as container for waste materials) are further characterized in that, the layer is formed of at least two parts, whereby the layer 2 formed by intermixing of filler material 3 is sealed with a covering layer 2a, preferably of silicone material.

In a fourth embodiment, utensils for cooking and household use, described above are further characterized in that the layer 2 is provided with an antibacterially effective amount up to about 2% (preferably at least about 0.5%) by volume of the layer of an antibacterially-acting additive 4.

In a fifth embodiment, utensils for cooking and household use described above are further characterized in that the antibacterial additive 4 is used as part of the total amount of filler.

In a sixth embodiment, utensils for cooking and household use described above are further characterized in that the antibacterial additive is comprised of heavy metal (e.g. silver, copper) and/or sulfur.

The waste container 6 of the invention is particularly useful for situations involving collecting wastes over a long time period, which is not unusual in a single-person household. In these situations there is the risk of a strong buildup of bacteria in the wastes between the times the container is emptied. In these circumstances, it is advantageous to use an "anti-stick" layer 2, but to provide the layer 2 with an additive with antibacterial effect 4. Such material as with the utensils described above can be used as part of the filler. Heavy metals in small concentration (e.g., silver and copper) have proven suitable for this purpose. Antibacterial effective amounts up to 2% by volume of the layer can advantageously be used. Preferably at least about 0.5% by volume is used.

Thus, the waste container of the present invention is characterized in a first embodiment in that at least its inner lining is comprised of a dirt-repelling layer 2 of an adhesion-reducing polymeric material.

In a second embodiment the waste container is further characterized in that the adhesion-reducing material contains PTFE (polytetrafluoroethylene).

In a third embodiment, the waste container is further characterized in that the adhesion-reducing material contains silicone.

In a fourth embodiment the waste container described above is further characterized in that the layer is provided with approximately 3–40% and preferably about 8–10% by volume of the layer, of a filler 3 with a particle size ≧ the thickness of the layer, for producing a rough surface.

In a fifth embodiment the waste container described above is further characterized in that the thickness of the layer lies in a range between 5 $\mu$m and 20 $\mu$m, preferably between 7 $\mu$m and 15 $\mu$m and the average particle diameter is 10% greater than the thickness of the layer each time. The particle size will, therefore, have a diameter usually in range from about 5.5 to 22 $\mu$m depending on the layer thickness used, to give a microscopic "roughness" to the surface.

Figure 6:
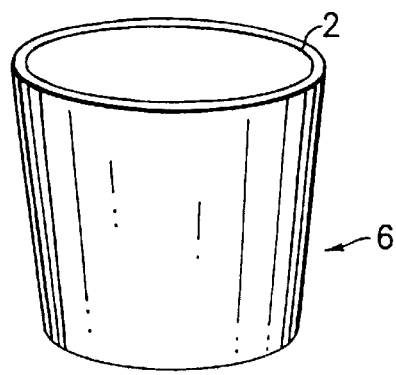
FIG. 6 is a waste container having an anti-stick coating according to the invention.

In a sixth embodiment the waste container 6 (FIG. 6) described above is further characterized (with reference to FIG. 3) in that the layer is comprised of at least two parts, whereby the layer 2 is formed by mixing about 3–40% and preferably about 8–10% by volume of the total volume of the layer 2 with the filler material and this is sealed with a covering layer 2a, preferably of silicone material.

In a seventh embodiment the waste container 6 described above is further characterized in that the layer 2 is provided with an with an antibacterial effective additive 4 in an amount of up to about 2% by volume of the total layer 2, volume. Preferably at least about 0.5% by volume is used.

In an eighth embodiment, the waste container 6 described above is further characterized in that the bacterial additive is used as part of the total amount of filler.

In a ninth embodiment the waste container described above is further characterized in that the bacterial additive is comprised of heavy metal (e.g. silver, copper) and/or sulfur.

Although illustrative embodiments of the present invention have been described herein with reference to the accompanying drawings, it is to be understood that the invention is not limited to those precise embodiments, and that various other changes and modification may be effected therein by one skilled in the art without departing from the scope or spirit of the invention.

What is claimed is:

1. An improved waste container, having an inner lining and wherein the inner lining has at least an inner layer comprised of a dirt-repelling layer of an adhesion-reducing polymer material and wherein said dirt-repelling layer has a non-smooth surface.

2. The waste container according to claim 1, wherein the adhesion-reducing material contains PTFE (polytetrafluoroethylene).

3. The waste container according to claim 1, wherein the adhesion-reducing material contains silicone.

4. The waste container according to claim 1, wherein the inner layer is provided with a filler in an amount of about 3% to about 40% by volume of the total volume of the inner layer, and having a particle size ≧ the thickness of the layer, whereby a non-smooth surface is produced.

5. The waste container according to claim 4, wherein the thickness of the inner layer lies in a range between 5 $\mu$m and 20 $\mu$m, preferably between 7 $\mu$m and 15 $\mu$m and the particle diameter is about 10% greater than the thickness of the layer.

6. The waste container according to claim 5, wherein the inner lining is comprised of at least two parts, said inner layer and a covering layer and wherein the inner layer is formed by mixing with the filler material and this is sealed with the covering layer of silicone material.

7. The waste container according to claim 4, wherein the inner layer is provided with an effective amount of an antibacterial additive.

8. The waste container according to claim 7, wherein the filler comprises said antibacterial additive.

9. The waste container according to claim 8, wherein the additive is comprised of heavy metal and/or sulfur.

10. The waste container according to claim 9, wherein the additive is comprised of the heavy metal and wherein the heavy metal is silver or copper.

11. The waste container according to claim 1, wherein the inner layer is provided with a filler in an amount of about 8% to about 10% by volume of the total volume of the inner layer, and having a particle size ≧ the thickness of the layer, whereby a non-smooth surface is produced.

* * * * *